United States Patent [19]
Förster

[11] 4,275,660
[45] Jun. 30, 1981

[54] AUTOMATICALLY CROSS-GUIDED VEHICLE, ESPECIALLY FOR THE PUBLIC LOCAL PASSENGER TRAFFIC

[75] Inventor: Hans-Joachim Förster, Stuttgart, Fed. Rep. of Germany

[73] Assignee: Daimler-Benz Aktiengesellschaft, Stuttgart, Fed. Rep. of Germany

[21] Appl. No.: 945,335

[22] Filed: Sep. 25, 1978

[30] Foreign Application Priority Data

Sep. 24, 1977 [DE] Fed. Rep. of Germany ....... 2743077

[51] Int. Cl.³ ............................................. B61F 9/00
[52] U.S. Cl. ................................... 104/247; 104/242
[58] Field of Search ....................... 104/245, 247, 242; 280/88, 89, 81 A, 268, 776; 180/131, 82 R, 141, 103 BF; 267/168, 169

[56] References Cited
FOREIGN PATENT DOCUMENTS

| | | | |
|---|---|---|---|
| 2719705 | 11/1978 | Fed. Rep. of Germany | 104/247 |
| 2721071 | 11/1978 | Fed. Rep. of Germany | 104/247 |
| 44305 | 9/1934 | France | 267/168 |
| 2355703 | 1/1978 | France | 104/247 |
| 365316 | 12/1938 | Italy | 104/247 |
| 667247 | 9/1964 | Italy | 104/247 |
| 682452 | 2/1965 | Italy | 104/247 |

*Primary Examiner*—John J. Love
*Assistant Examiner*—Ross Weaver
*Attorney, Agent, or Firm*—Craig and Antonelli

[57] ABSTRACT

A steerable vehicle adapted to be driven on roads, especially for the public local passenger traffic, which has a steerable axle with deflectable wheels and at least one axle with wheels immovable relative to the axle which is pivotally secured at the vehicle in a bogey-like manner, and with cross-guide rollers mounted on both sides of the vehicle within the area of the vehicle axles and carried at least indirectly by the respective axle bodies. The pivotal axle is elastically centered in a straight driving position, out of which it is pivotal by the steering forces produced by the cross-guide rollers against the force of centering springs, whereby the centering springs and the prestress are chosen so strong that brake force differences of one vehicle side compared to the other side do not effect an automatic axle deflection.

14 Claims, 6 Drawing Figures

AUTOMATICALLY CROSS-GUIDED VEHICLE, ESPECIALLY FOR THE PUBLIC LOCAL PASSENGER TRAFFIC

The present invention relates to an automatically cross-guided vehicle, especially for the public local passenger traffic, which includes a steerable axle with deflectable wheels and with at least one axle having wheels immovable relative to the axle which is pivotally secured at the vehicle in a bogey-like manner, and with cross-guide rollers mounted on both sides of the vehicle within the area of the vehicle axles and carried at least indirectly by the respective axle bodies.

With cross-guided vehicles, which are positively guided on a track by means of lateral cross-guide rollers between cross-guide webs of the road, it is necessary that the rear axle is able to adjust itself during curve drives at least approximately radially to the curve predetermined by the cross-guide webs for purposes of avoiding or at least reducing an excessive tire wear. Prior proposals of the assignee of the present application provided in that connection that the axle for a non-track-guided drive of the vehicle on normal roads is form-lockingly locked in an exact cross-position and in that this locking action is lifted for a track-tied drive between cross-guide webs. Such a form-locking locking system is not only relatively costly from a constructive and manufacturing point of view but also requires a certain length of time for the engagement of the locking system. It is thereby necessary that at first the exact cross-position of the axle is established. If one desires to undertake this locking action during the drive, then a certain drive without cross guidance and without mechanical locking of the rear axle in its cross-position is unavoidable.

It is the aim of the present invention to simplify the constructive and manufacturing expenditures for such a locking system as well as to shorten timewise and to simplify also the transition from a track-tied drive to a track-non-tied-drive and vice-versa.

The underlying problems are solved according to the present invention in that the pivotal axle is elastically centered in a straight driving direction, out of which it is pivotal by the steering forces produced by the cross-guide rollers against the force of the centering springs, whereby the centering springs and the prestress thereof are selected so strong that brake force differences of one vehicle side with respect to the other side cannot effect an automatic axle pivoting.

Owing to the elastic centering of the axle which is nonsteerable as such, in the straight driving direction, a mechanical locking of the axle can be dispensed with. Nonetheless, by reason of a correspondingly hard selection of the springs, a sufficiently accurate straight guidance of the axle is assured in case of a track non-tied drive, i.e., when driving in the customary manner on normal roads.

The pivotability of the axle can be brought about by a pair of triangular guide members engaging in the pivot center on the side of the axle, which preferably engage centrally at a relatively high point of the axle body.

The centering springs may engage at a relatively low point of the axle body in the manner of longitudinal guide members and may take over the function of longitudinal guide members which maintain the cross-position of the axle as well as absorb the braking and acceleration moments which act on the axle. The centering springs may be prestressed more strongly during the braking and/or during the acceleration than normally, as a result of which they are able to better assume the task of the axle support against braking and acceleration moments.

Undoubtedly, the pivoting of the axle with respect to the vehicle body will be connected with certain friction moments which oppose a rapid and exact return of the rear axle into the cross-position. A certain return hysteresis might result therefrom. In order to preclude such a hysteresis, the centering springs may be equipped with a constraint in such a manner that with oppositely acting springs, only one of the oppositely operating springs is always effective during a deflection and the two mutually oppositely operating springs just contact one another only in an exact cross-position.

The centering springs may also be formed by several coaxial nested coil springs or by air-spring-bellows. Instead of such spring elements extending in the vehicle longitudinal direction, also a packet of leaf springs extending transversely to the vehicle longitudinal direction may be provided.

Accordingly, it is an object of the present invention to provide an automatically cross-guided vehicle, especially for the public local passenger traffic which avoids by simple means the aforementioned shortcomings and drawbacks encountered in the prior art.

Another object of the present invention resides in an automatically cross-guided vehicle, especially for the public local passenger traffic, which is simple in construction and relatively low in manufacturing costs.

A further object of the present invention resides in an automatically cross-guided vehicle of the type described above which greatly increases the safety of the vehicle, especially when passing from a track-tied drive to a track-non-tied-drive and vice-versa.

A still further object of the present invention resides in an automatically cross-guided vehicle which eliminates a certain time lapse previously required for engaging the locking mechanism of the rear axle when passing from a track-tied drive to a normal road traffic.

Another object of the present invention resides in an automatically cross-guided vehicle, especially for the public local passenger traffic, which completely dispenses with the need of a mechanical locking mechanism for the axle.

These and other objects, features and advantages of the present invention will become more apparent from the following description when taken in connection with the accompanying drawing which shows, for purposes of illustration only, several embodiments in accordance with the present invention, and wherein.

Figure 1:
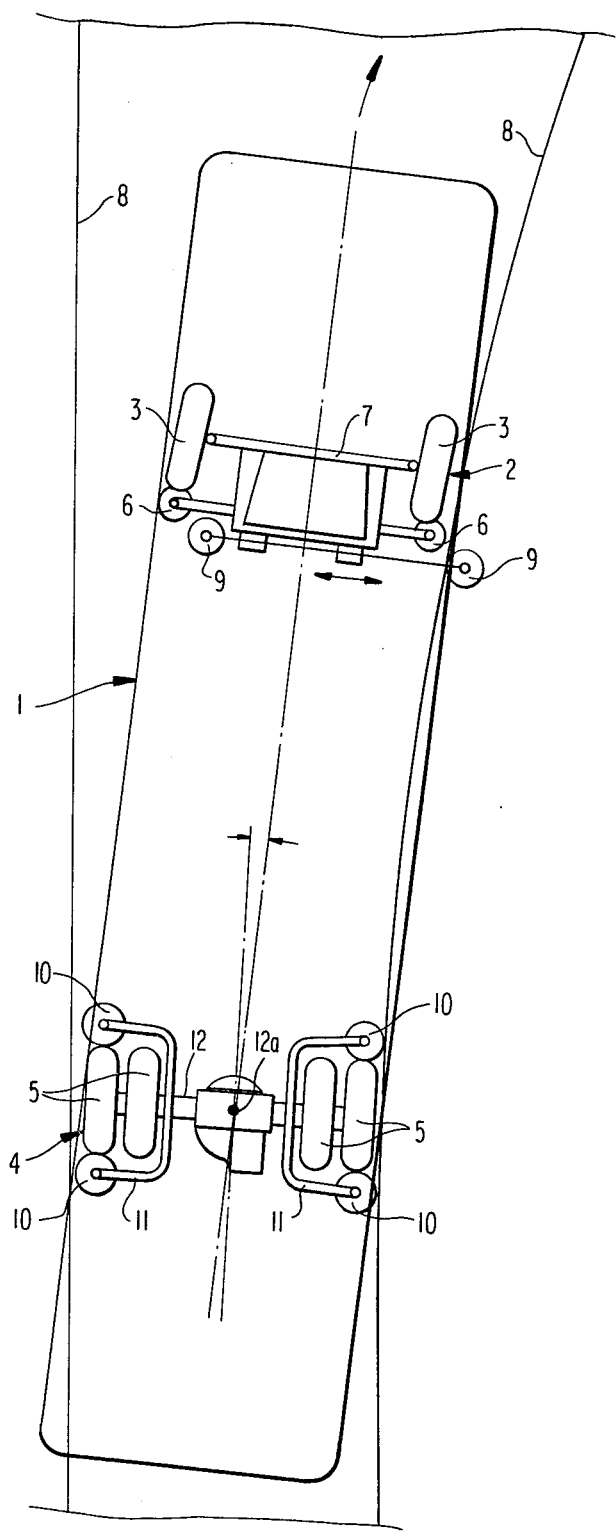
FIG. 1 is a schematic plan view on an automatically cross-guided vehicle with a pivotal rear axle according to the present invention.

Referring now to the drawing wherein like reference numerals are used throughout the various views to designate like parts, the illustrated vehicle generally designated by reference numeral 1 includes a front axle generally designated by reference numeral 2 which is steerable as such and includes deflectable or steerable wheels 3, and a rear axle generally designated by reference numeral 4 which is non-steerable and includes wheels 5 immovable relative to the rear axle body. One cross guide roller 6 is provided on each vehicle side within the area of the front axle 2, which is at least indirectly rigidly connected with the axle body 7 of the front axle 2 and which are track-determinative for the front part of the vehicle within the area of track guidances on both sides—the cross guide webs 8 mounted along the sides of the road serve for this purpose. The front cross-guide rollers 6 may be combined with the vehicle steering system. In addition to the front cross-guide rollers 6, switch guide rollers 9 adapted to be alternately extended are provided which extend over a switch guide web and take over in an auxiliary manner the cross-guidance function of the mutually oppositely disposed, temporarily non-actuated rollers 6.

Figure 2:
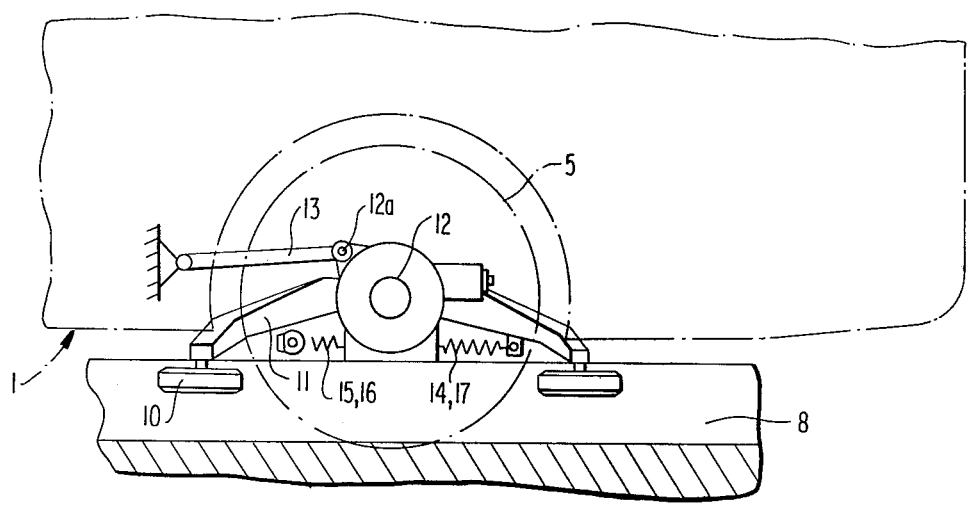
FIG. 2 is a partial side view of a rear axle of a vehicle according to FIG. 1.
Figure 3:
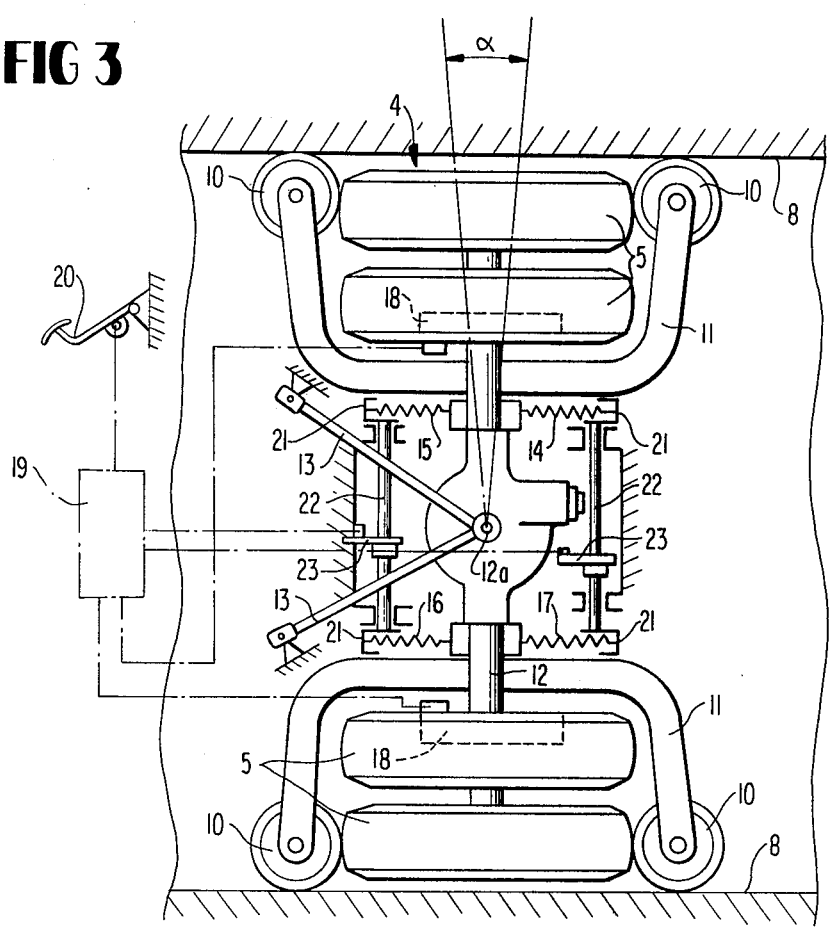
FIG. 3 is a schematic plan view on a rear axle according to FIG. 2.

Two cross-guide rollers 10 are provided on each vehicle side within the area of the bogey-like movable rear axle 4, which are supported in front, respectively, to the rear of the wheels 5 on fork-shaped support arms 11 and are rigidly coupled to the rear axle body 12. The pairwise roller arrangement for each vehicle side within the area of the rear axle makes it possible to exert directional moments on the rotary axle 4 by way of the cross-guide rollers 10 and to deflect the rear axle 4 in the sense of a track-true rolling-off along the mechanically predetermined track. An unnecessary width requirement of the vehicle is avoided thereby since with an immovable rear axle the vehicle has the tendency within the area of the rear axle to deflect toward the inside of the curve. As to the rest, an unnecessary tire wear on the rear wheels is avoided by the pivotability. The pivot center 12a of the rear axle body 12 is predetermined by a pair of triangular guide members 13 (FIGS. 2 and 3) engaging centrally at the axle body 12. The point of engagement of this pair of triangular guide members 13 at the axle body 12 is located relatively high. Four centering springs 14 to 17 extending in the longitudinal direction engage at relatively low points of engagement, which are arranged pairwise coaxially disposed one behind the other and which take over the function of longitudinal guide members and additionally have the task to support the rear axle body against braking and accelerating moments. On the side of the frame, these centering springs 14 to 17 are supported by way of spring abutments 21 (FIG. 3). The springs 14–17 are constructed so hard and prestressed so strongly that brake force differences on one vehicle side with respect to the other side do not lead to an automatic inclined running of the rear axle with a trake-non-tied drive. In order to be able to utilize still better this elastic centering effect also during stronger braking actions, provision is made that the centering springs are still more strongly prestressed during braking actions. For that purpose, the spring abutments 21 are coupled to eccentric shafts 22 (FIG. 3) which can be pivoted or rotated by way of levers 23. The pivoting of the shafts 22 can be controlled by the brake-actuating installation 19 which also acts upon the brakes 18 of the rear axle and which, in its turn, is controlled by the brake pedal 20. In lieu of an eccentric shaft, the levers 23 may also be equipped with eccentric bushes which during pivoting effect a cross displacement of the shaft and of the spring abutments. The spring abutment as the frame should thereby be so constructed (preferably tiltable or pivotal) that the lateral inclined deflection of the springs 14 to 17 which results from a spring inward movement of the axle relative to the frame, can be absorbed by these springs without transversely loading or stressing the same.

Figure 4:
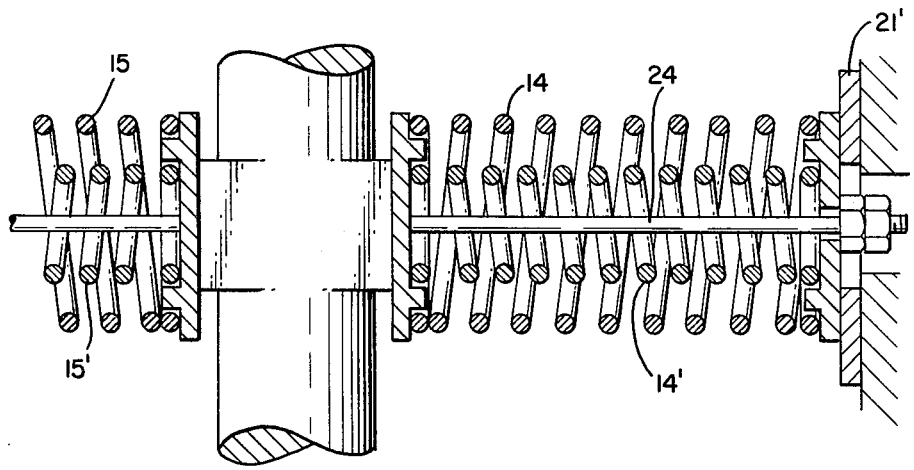
FIG. 4 is a partially schematic cross-sectional view of coaxially nested coil springs forming centering springs in accordance with the present invention.

The centering springs 14–17 may be formed, as shown in FIG. 4, by at least two coaxially nested coil springs 14, 14', 15, 15', etc. Additionally, unlaterally effective restraint means such as, for example, a tie rod 24, may be provided for preventing a spring expansion of each of the centering springs 14–17 so as to limit the spring length to an expansion condition corresponding to the normal position of the pivotal axle 4.

Figure 5:
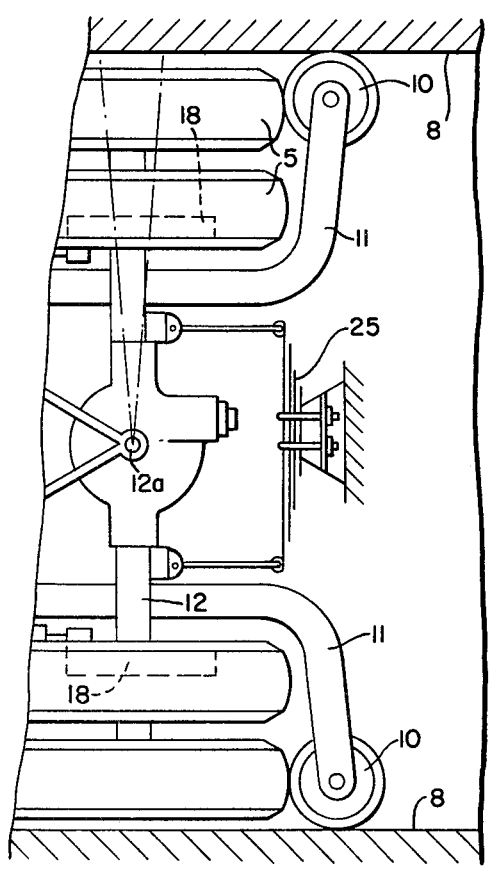
FIG. 5 is a schematic partial plan view of a rear axle according to the present invention having centering springs constructed as leaf springs.
Figure 6:
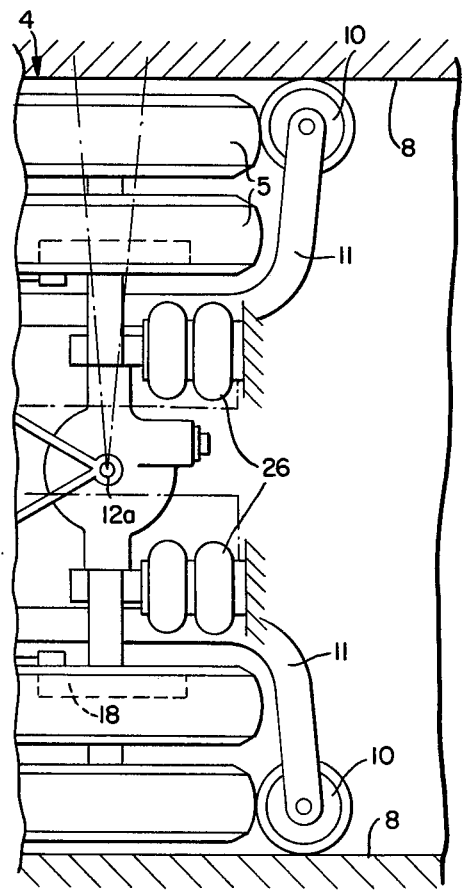
FIG. 6 is a schematic partial plan view of a further embodiment of a rear axle in accordance with the present invention having centering springs constructed as spring bellows.

As shown in FIGS. 5 and 6, the centering springs may be formed by at least one set of leaf springs 25 disposed parallel to the pivotal axle 4 and connected centrally of the frame or be constructed as spring bellows 26.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A steerable vehicle adapted for track tied and non-track-tied operation, the vehicle comprising a steerable axle means having deflectable wheels and at least one axle means having non-steerable wheels relative to the axle means, said last-mentioned axle means being pivotally secured at the vehicle, and cross-guide roller means mounted on the vehicle on both sides thereof within an area of the vehicle axle means and carried at least indirectly by the respective axle bodies of the axle means, characterized in that the pivotal axle means is elastically centered in a straight driving position, the pivotal axle means being pivotal out of straight driving position by steering forces produced by the cross-guide roller means against the force of centering spring means, the centering spring means and the prestress thereof being selected so as to be so strong that brake force differences of one vehicle side with respect to the other do not produce an automatic axle pivoting, and in that means are provided for more strongly prestressing the centering spring means during braking than normally.

2. A vehicle according to claim 1, characterized in that the vehicle is for the public local passenger traffic.

3. A vehicle according to claim 1, characterized in that the pivotal axle means is pivotally secured at the vehicle in a bogey-like manner.

4. A vehicle according to claim 1, characterized in that the spring prestress is increased corresponding to the brake force.

5. A vehicle according to claim 1, with at least two mutually oppositely operating centering spring means, characterized in that a unilaterally effective restraint means preventing a spring expansion is coordinated to each of the centering spring means, which limits the spring length to an expansion condition corresponding to the normal position of the pivotal axle means.

6. A vehicle according to claim 5, characterized in that two centering spring means constructed as coil compression springs engage of each vehicle side at the axle body of the pivotal axle means, which are arranged coaxially one behind the other, which extend at last approximately in the vehicle longitudinal direction and which are supported with the mutually facing ends thereof at the axle body and with the oppositely disposed ends thereof at a respective relatively fixed point of the vehicle.

7. A vehicle according to claim 6, characterized in that each of the centering spring means is formed by at least two coaxially nested coil springs.

8. A vehicle according to claim 1, characterized in that the centering spring means are formed by at least one set of leaf springs disposed parallel to the pivotal axle means and connected centrally with the vehicle frame.

9. A vehicle according to claim 1, characterized in that air spring bellows are provided as spring means.

10. A vehicle according to claim 1, characterized in that two centering spring means constructed as coil compression springs engage on each vehicle side at the axle body of the pivotal axle means, which are arranged coaxially one behind the other, which extend at least approximately in the vehicle longitudinal direction and which are supported with the mutually facing ends thereof at the axle body and with the oppositely disposed ends thereof at a respective relatively fixed point of the vehicle.

11. A vehicle according to claim 10, characterized in that each of the centering spring means is formed by at least two coaxially nested coil springs.

12. A vehicle according to claim 3, with at least two mutually oppositely operating centering spring means, characterized in that a unilaterally effective restraint means preventing a spring expansion is coordinated to each of the centering spring means, which limits the spring length to an expansion condition corresponding to the normal position of the pivotal axle means.

13. A vehicle according to claim 3, characterized in that the centering spring means are formed by at least one set of leaf springs disposed parallel to the pivotal axle means and connected centrally with the vehicle frame.

14. A vehicle according to claim 3, characterized in that air spring bellows are provided as spring means.

* * * * *